United States Patent Office 3,464,916
Patented Sept. 2, 1969

3,464,916
METHOD FOR IMPROVING DISTILLATION
EFFICIENCY OF ORGANIC LIQUIDS
Walter R. Privette, La Grange, Ill., assignor to Nalco
Chemical Company, Chicago, Ill., a corporation of
Delaware
No Drawing. Filed Apr. 10, 1967, Ser. No. 629,379
Int. Cl. B01d 3/36; C10g 31/06
U.S. Cl. 208—348                                    7 Claims

ABSTRACT OF THE DISCLOSURE

This invention relates to a method for increasing distillation efficiency of fractionation equipment used to separate organic liquids by the use of certain fluorosilicone polymers.

---

Tray columns and packed towers are a form of liquid-gas transfer devices which are used for the separation of chemicals based on phase-equilibria relationships. A common separation accomplished by distillation columns is the fractionation of organic liquids.

While the invention may be practiced by chemically treating either tray columns, or packed columns, it is particularly directed to treatment of organic liquids which are separated in tray columns, particularly cross-flow tray columns. These columns as well as other distillation units are usually of fixed design from the standpoint that they are tailored to separate specific liquid systems.

In tray columns, operating efficiency is frequently diminished by such phenomena as excessive entrainment, flooding, or priming. These phenomena are indirectly associated with such specific chemical phenomena as misting, viscosities of liquids moving through the trays of tower columns, surface tension, lubricity and diffusion. The physical chemical phenomena which are interrelated with the above include such effects as double layer repulsion forces and the like.

It has been found that when one or more of the above factors in a given tower system are altered sufficiently, an increase in distillation efficiency is achieved. This increase in distillation efficiency is evidenced by an increased throughput and by an increase in the fractionation power of the system.

An important feature of the invention, in a specific embodiment thereof, resides in the startling discovery that fluorosilicone polymers are extremely effective in improving distillation efficiency when they are added at a point just above the column interface, which interface is the junction of the distillates being separated. It therefore becomes an object of the invention to provide a chemical method for improving the distillation efficiency of a fixed design distillation system used to fractionate organic liquids.

Another object of the invention is to utilize fluorosilicone polymers for improving the efficiency of fixed design distillation systems by adding such chemicals to such systems at a point above the interface thereof.

Other objects will appear hereinafter.

This invention is directed to the use of fluorosilicone polymers to improve the distillation efficiency of units used to fractionate organic liquids. As indicated, the invention has particular applicability to improving the efficiency of tray and packed distillation columns. It is singularly effective in improving the operational efficiency of fixed design units which contain cross-flow tray columns.

The invention is also useful when the fluorosilicone polymers are added to the systems at a point just above the column interface, whereby remarkable throughput improvements are achieved.

The fluorosilicone polymers are added to the systems so as to provide, based on the weight of the liquids being treated, at least 0.1 p.p.m. of the active fluorosilicone polymer. Experience has shown that the dosage need not exceed 100 p.p.m. In cost cases the effective dosage range rarely exceeds 5 p.p.m.

The fluorosilicone polymers used in the practices of the invention should contain a fluorine and silicon to provide a fluorine-to-silicon ratio of about 4:1 to 1:4. In a preferred embodiment, the fluorosilicone polymers have a fluorine-to-silicon ratio of 2:1 to 1:2 and most preferably the ratio is about 1:1.

Fluorosilicone polymers are well-known materials and have been described in numerous U.S. patent. See, for example, the disclosures of U.S. 2,894,969, U.S. 2,961,425, U.S. 2,983,746, U.S. 3,002,951, U.S. 3,105,810 and U.S. 3,115,472.

Typical polymers used in the practice of this invention contain as a portion of their structure the units

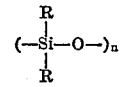

In the above formula R is an organic radical which contains at least 2 fluorine atoms attached to 1 carbon atom, or it may be a radical exemplified by lower alkyl radicals of less than 4 carbon atoms. Also, it may be a phenyl group, a lower substituted phenyl group, a lower alkoxy radical or hydrogen. It is, of course, understood that at least one occurrence of R should contain at least two fluorine atoms which are attached to one carbon atom. $n$ is an integer. These units should represent at least about 50% of the units of the polymer.

A particularly useful group of fluorosilicone polymers are those which contain at least 90% of the units which have the formula

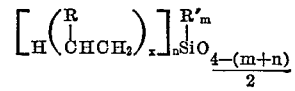

in which each R is a perfluoroalkyl radical of less than eleven carbon atoms, each R′ is a monovalent aliphatic hydrocarbon radical of less than 4 carbon atoms, each $x$ has a value of from 1 to 3, each $n$ has a value of from 1 to 3, each $m$ has a value of from 0 to 2, and the sum of $n+m$ is no greater than 3. The remaining siloxane units, if any, in the polysiloxane have the unit formula

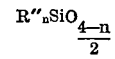

in which each R″ is selected from the group consisting of hydrogen atoms, monovalent hydrocarbon radicals and halogenated monovalent hydrocarbon radicals and $n$ is as above defined.

As stated above, R can be any perfluoroalkyl radical containing from one to ten carbon atoms, such as $CF_3$—, $C_2F_5$—, $C_3F_7$—, and so on up to $C_{10}F_{21}$—. These perfluoroalkyl radicals can be either straight or branch chained radicals. R′ can be the methyl, ethyl, propyl, vinyl or allyl radicals, preferably methyl. R″ can be hydrogen or any monovalent hydrocarbon radical, such as alkyl radicals, e.g., methyl, ethyl, tert-butyl, 2-ethylhexyl, octadecyl and myricyl; cycloalkyl radicals, e.g., cyclopentyl and cyclohexyl; alkenyl radicals, e.g., vinyl, allyl and butadienyl; cycloalkenyl radicals, e.g., 3,4-cyclopentenyl and 2,3-cyclohexenyl; aryl radicals, e.g., phenyl, xenyl and naphthyl; alkaryl radicals, e.g., tolyl and xylyl and aralkyl radicals, e.g., benzyl and phenylethyl. R″ can also be any monovalent halogenated hydrocarbon radical, for instance, halogenoalkyl radicals such as monochloromethyl, 2,2-dibromoethyl, 5,5,5-trifluoro-2-(trifluoromethyl)amyl and 5,10,15-tridopentadecyl, halogenocycloalkyl radicals such as 1,2-dibromocyclopentyl, 2,3,3-trifluoro-2-chlorocyclobutyl and perchlorocyclohexyl, halogenoalkenyl radicals such as 2-chlorovinyl, 3,3-dibromoallyl and 3-iodobutadienyl, halogenocycloalkenyl radicals such as 3-fluoro-2,3-cyclopentenyl and 3-chloro-4-bromo-3,4-cyclohexenyl, halogenoaryl radicals such as 2,4,6-trifluorophenyl, 4,4'-dibromoxenyl and β-chloronaphthyl, halogenoaralkyl radicals such as α,α,α-trifluorotolyl and 2,4-dibromotolyl, and halogenoaralkyl radicals such as (perfluorophenyl)ethyl, 3,5-diiodobenzyl and α-bromobenzyl.

The value of $n$ can range from 1 to 3 while the value of $m$ ranges from 0 to 2, but the sum of $m+n$ cannot be greater than 3. In other words, the fluorinated organopolysiloxane employed in this invention can have any of the following siloxane units where Z is the

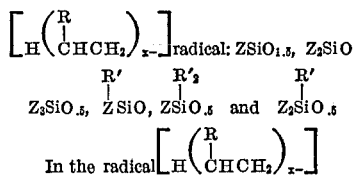

In the radical 

$x$ can have a value of from 1 to 3. When $x$ is 1, the radical is (RCH$_2$CH$_2$—) shown in U.S. Patent No. 2,979,519. When $x$ is more than 1, the radicals are

and shown in U.S. Patent 2,894,969. The teachings of these applications are herein incorporated by reference.

The compositions employed in this invention in which $x=1$ can be prepared starting with the chlorosilanes of the formula

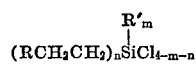

These, in turn, can be prepared by the reaction of an alkene of the formula RCH=CH$_2$ with a chlorosilane containing from 1 to 3 silicon-bonded hydrogen atoms in the presence of a peroxide or platinum catalyst at temperatures of from 150° to 300° C.

The olefins can be prepared starting with a perfluoro acid of the formula RCOOH, where R is an above defined, esterifying this acid with ethanol and thereafter reacting the ethyl ester with a mixture of methyl Grignard and isopropyl Grignard to give an alcohol of the formula

This secondary alcohol is then dehydrated by heating with P$_2$O$_5$ to give the olefin RCH=CH$_2$.

The above method is preferred where the R' groups on the silicon are saturated aliphatic groups. In those cases, however, where R' is an unsaturated aliphatic radical it is preferred to prepare these fluorocarbosiloxanes by the Grignard method. This can be done by reacting the olefins RCH=CH$_2$ with HBr to give the brominated compounds RCH$_2$CH$_2$Br and thereafter preparing a Grignard reagent of these materials which can be then reacted with a chlorosilane of the formula R'$_m$SiCl$_{4-m}$.

The compositions of this invention in which $x$ is 2 or 3 can be prepared by heating a fluoroalkene of the formula RCH=CH$_2$, where R is as above defined, in the presence of any free radical generator capable of activating the olefin, such as peroxides, to form telomers of the formula

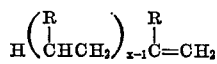

These are subsequently added to the silane of the formula R'$_m$SiH$_n$Cl$_{4-m-n}$ by olefinic addition.

An alternative method is via the Grignard method. This method involves preparing compounds of the formula

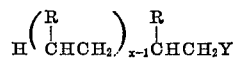

where Y is halogen, forming a Grignard reagent therefrom and reacting it with a silane of the formula

This method is preferred when it is desired to put two different fluorinated radicals on the silicon and/or when R' is an unsaturated aliphatic radical.

The siloxanes of this invention are best prepared by hydrolyzing either singly or in any mixture the above chlorosilanes, preferably dichlorosilanes with or without monochlorosilanes. If desired, the hydrolysis can be carried out in the presence of solvents such as ethers, toluene, xylene or other hydrocarbons.

The hydrolyzates of the dichlorosilanes can be further polymerized employing alkaline and acidic catalysts according to standard practice.

Another method of preparing the siloxane copolymers is by catalytic copolymerization using mixed siloxanes.

It is to be understood that the siloxanes employed herein can be either homopolymeric materials or copolymeric materials containing two or more different types of siloxane units and further that the organic radicals attached to any one silicon atom can be the same or different as long as they are within the scope of the claim.

Copolymers of the above-defined fluorinated siloxanes can contain up to 10 mol percent siloxane units of the formula $$R''_nSiO_{\frac{4-n}{2}}$$

in which R'' and $n$ are as above defined, without the effect of the fluorinated unit being appreciably diminished.

These copolymers can be prepared by cohydrolysis of the corresponding chlorosilanes or by the alkaline copolymerization of the corresponding cyclic trisiloxanes.

and copolymers such as a copolymer of 50 mol percent

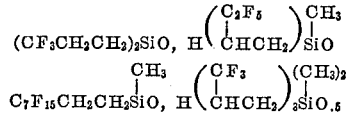

and 50 mol percent

a copolymer of 95 mol percent

and 5 mol percent diphenylsiloxane, a copolymer of 95 mol percent

4.75 mol percent phenylmethylsiloxane and .25 mol percent methylvinylsiloxane and a copolymer of 90 mol percent

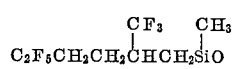

2 mol percent

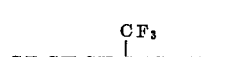

and 8 mol percent dimethylsiloxane.

The molecular size and form of any of the siloxanes employed in this invention is not critical. Thus, such siloxanes can vary from low to high molecular weight fluids, gums and resins.

The organic liquids which are treated by the fluorosilicone polymers are preferably hydrocarbon liquids of the type processed in the refining of petroleum and in the production of organic materials by petrochemical processing. Many stripping separation and purification operations conducted during such refinery procedures as cracking, isomerization, visbreaking light end distillation, catalytic fractionation and vacuum tower stripping are all suited to be treated.

Thus, distillation operations on crudes, gas oils, naphthas, kerosenes and the like, including petrochemicals, are remarkably improved by treating the distillation units used in processing these liquids with the fluorosilicone polymers previously described. While the invention is advantageously used to act upon hydrocarbon liquids, it may also be used to treat polar organic liquids which are purified by distillation operations. Thus, a variety of polar organic compounds produced by the chemical industry can be effectively purified and separated from contaminates at higher throughput rates without flooding and priming of distillation columns occurring.

EXAMPLES

In order to demonstrate the efficacy of the invention, a composition was prepared which contained 3% of a fluorosilicone polymer dissolved in a 50–50 mixture of dimethyl formamide and isoamyl acetate. This particular fluorosilicone polymer had the approximate formula: 95 mole percent of

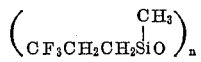

and 5 mole percent of dimethyl siloxane. It is a viscous liquid.

The above formula was used to treat the following organic liquids:

(1) An intermediate feed naphtha which was contaminated with low boiling organic liquids.
(2) Impure hexane.
(3) A delayed coker feed stock.

In all of the above cases the dosage level provided to these systems was 0.5 p.p.m. of the polymer. They all were being subjected to distilaltion in tray columns. The chemical was added at the column interface. In each instance the throughput of the systems was increased by at least 10% and in some cases was nearly doubled.

Based on the above, it is evident that the invention has provided a substantial contribution to the art of distilling organic liquids. By adding minute amounts of fluorosilicone polymers, it is possible to act upon a large variety of organic liquids to greatly improve their characteristics when being purified or separated by distillation or fractionation techniques.

The invention is hereby claimed as follows:

1. A method for improving the efficiency of fixed design distillation columns which have during operation a column interface, which is the junction of the distillates being separated, said columns being used to separate mixtures of organic-hydrocarbon liquids of the types processed in the refining of petroleum and in petrochemical processing which comprises treating the liquids being fractionated by said columns at a point above the column interface with at least 0.1 p.p.m. of a fluorosilicone polymer having a fluorine to silicon ratio within the range of 4:1 to 1:4.

2. The method of claim 1 where the fluorine to silicon ratio is within the range of from 2:1 to 1:2.

3. The method of claim 1 where the fluorine to silicon ratio is about 1:1.

4. A method for improving the efficiency of fixed design distillation columns which have during operation a column interface, which is the junction of the distillates being separated, said columns being used to separate mixtures of organic-hydrocarbon liquids of the types processed in the refining of petroleum and in petrochemical processing which comprises treating the liquids being fractionated by said columns at a point above the column interface with at least 0.1 p.p.m. of a fluorosilicone polymer having as a part of its structure the units:

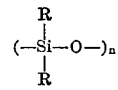

where R is from the group consisting of:
(A) organic radicals which contain at least 2 fluorine atoms attached to 1 carbon atom, and
(B) radicals from the group consisting of lower alkyl radicals of less than 4 carbon atoms, phenyl, lower substituted phenyl radicals, alkoxy radicals and hydrogen, with the proviso that at least one occurrence of R is (A) and $n$ is a small whole number.

5. The method of claim 1 where the fixed design distillation system is a tray column.

6. The method of claim 5 where the tray column is a cross-flow tray column.

7. A method for improving the efficiency of fixed design distillation columns which have during operation a column interface, which is the junction of the distillates being separated, said columns being used to separate mixtures of organic-hydrocarbon liquids of the types processed in the refining of petroleum and in petrochemical processing which comprises treating the liquids being fractionated by said columns at a point above the column interface with at least 0.1 p.p.m. of a fluorosilicone polymer, at least 90% of the units of which have the formula

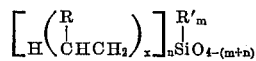

in which each R is a perfluoroalkyl radical of less than 11 carbon atoms, each R' is a monovalent aliphatic hydrocarbon radical of less than 4 carbon atoms, each $x$ has a value from 1 to 3, each $n$ has a value from 1 to 3 and, each $m$ has a value from 0 to 2 and the sum of $n+m$ is no greater than 3, the remaining siloxane units having the unit formula

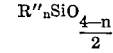

in which each R'' is selected from the group consisting of hydrogen atoms, monovalent hydrocarbon radicals and $n$ is as above defined.

References Cited

UNITED STATES PATENTS

| | | | |
|---|---|---|---|
| 3,027,307 | 3/1962 | Stoffer et al. | 202—160 |
| 3,115,472 | 12/1963 | Currie | 252—358 |
| 3,188,336 | 6/1965 | Hazeldine | 260—448.2 |
| 3,317,429 | 5/1967 | Cekada | 260—448.2 X |
| 3,317,578 | 5/1967 | Prescott et al. | 260—448.2 |
| 3,318,844 | 5/1967 | Krantz | 260—448.2 X |

OTHER REFERENCES

"ABC's of Defoaming," pamphlet of Dow Chemical Co. (1960), pages 2 and 3.

HERBERT LEVINE, Primary Examiner

U.S. Cl. X.R.

203—57; 252—358